(12) United States Patent
Miyakoshi et al.

(10) Patent No.: US 9,487,109 B2
(45) Date of Patent: Nov. 8, 2016

(54) SEAT LOCK DEVICE

(71) Applicant: MITSUI KINZOKU ACT CORPORATION, Kanagawa (JP)

(72) Inventors: Tsutomu Miyakoshi, Kanagawa (JP); Naoki Hanaki, Kanagawa (JP)

(73) Assignee: MITSUI KINZOKU ACT CORPORATION, Kanagawa (JP)

( * ) Notice: Subject to any disclaimer, the term of this patent is extended or adjusted under 35 U.S.C. 154(b) by 0 days.

(21) Appl. No.: 14/822,720

(22) Filed: Aug. 10, 2015

(65) Prior Publication Data
US 2016/0107547 A1   Apr. 21, 2016

(30) Foreign Application Priority Data

Oct. 16, 2014   (JP) ................. 2014-212080

(51) Int. Cl.
*B60N 2/20* (2006.01)
*B60N 2/22* (2006.01)
*B60N 2/44* (2006.01)

(52) U.S. Cl.
CPC .............. *B60N 2/2245* (2013.01); *B60N 2/20* (2013.01); *B60N 2/442* (2013.01); *B60N 2002/4455* (2013.01)

(58) Field of Classification Search
CPC . B60N 2/3011; B60N 2/3013; B60N 2/2245
USPC ................. 296/65.01, 65.16, 67; 297/378.13
See application file for complete search history.

(56) References Cited

U.S. PATENT DOCUMENTS 8,511,723 B2 *  8/2013  Otsuka ............... B60N 2/01583
                                                                292/216
2012/0261929 A1 * 10/2012  Bruck ..................... B60N 2/366
                                                                292/226

FOREIGN PATENT DOCUMENTS

JP        2012-127402 A      7/2012

* cited by examiner

*Primary Examiner* — Dennis H Pedder
(74) *Attorney, Agent, or Firm* — McDermott Will & Emery LLP

(57) ABSTRACT

A seat lock device includes an engagement portion engaged with a vehicle body member extending in a vehicle width direction on a rear side of a front wall of a rear parcel shelf. The rear parcel shelf forms an upper wall of a trunk room arranged on a rear side of a vehicle. The seat lock device is attached to the front wall of the rear parcel shelf, engaged with a striker provided to a rear face of a seat arranged in front of the trunk room to hold the seat in an erect posture, and releases an engagement state thereof with the striker by a release operation of a release operation member arranged in the trunk room.

9 Claims, 7 Drawing Sheets

FRONT SIDE ⟵⟶ REAR SIDE

FRONT SIDE ←——→ REAR SIDE

SEAT LOCK DEVICE

CROSS-REFERENCE TO RELATED APPLICATION(S)

The present application claims priority to and incorporates by reference the entire contents of Japanese Patent Application No. 2014-212080 filed in Japan on Oct. 16, 2014.

BACKGROUND OF THE INVENTION

1. Field of the Invention

The present invention relates to a seat lock device that locks a sheet placed in front of a trunk room arranged on the rear side of a vehicle in an erect posture.

2. Description of the Related Art

In a sedan type vehicle, there has been widely used a structure that a seat back (backrest) of a rear seat is capable of being frontwardly inclined thus communicating between the trunk room arranged on the rear side of the vehicle and a passenger compartment. In such a structure, the sheet is generally held in an erect posture by engaging a striker provided to the seat back with an engagement member of a seat lock device.

Japanese Patent Application Laid-open No. 2012-127402 discloses a structure that a seat lock device is attached to a front wall of a rear parcel shelf forming an upper wall of a trunk room, a release operation member to release the engagement state of the seat lock device and the striker is arranged in the trunk room, and a cable for release operation force transmission connects the release operation member with the seat lock devices.

In such a structure, there has been a concern over the problem that, when baggage in the trunk room strongly presses the seat back in the frontward direction at the time of sudden braking of a vehicle or input of an impact to the vehicle, the seat lock device is moved frontwardly by the tractive force of the striker, and a release operation on the cable is forcibly performed. For this reason, in the structure disclosed in Japanese Patent Application Laid-open No. 2012-127402, a U-shaped bent portion is formed in a cable routing part, thus preventing an unintended release operation of the seat lock device.

Here, in the structure disclosed in Japanese Patent Application Laid-open No. 2012-127402, it is possible to prevent the unintended release operation of the seat lock device at the time of sudden braking of a vehicle, or input of an impact to the vehicle. However, the pressing force of the baggage moved frontwardly deforms the front wall of a rear parcel shelf, and the seat lock device is also moved frontwardly and hence, it is necessary to repair the vehicle depending on circumstances. In this case, the front wall of the rear parcel shelf may be reinforced for preventing the deformation thereof; however, there has been a drawback such as the increase in weight of the vehicle or the complication of a vehicle structure.

For the foregoing reasons, there is a need for a seat lock device capable of preventing an unintended release operation of the seat lock device at the time of sudden braking of the vehicle or input of an impact to the vehicle

SUMMARY OF THE INVENTION

It is an object of the present invention to at least partially solve the problems in the conventional technology.

A seat lock device according to one aspect of the present invention includes an engagement portion engaged with a vehicle body member extending in a vehicle width direction on a rear side of a front wall of a rear parcel shelf. The rear parcel shelf forms an upper wall of a trunk room arranged on a rear side of a vehicle. The seat lock device is attached to the front wall of the rear parcel shelf, engaged with a striker provided to a rear face of a seat arranged in front of the trunk room to hold the seat in an erect posture, and releases an engagement state thereof with the striker by a release operation of a release operation member arranged in the trunk room.

A seat lock device according to another aspect of the present invention includes: an engagement portion engaged with a vehicle body member extending in a vehicle width direction on a rear side of a front wall of a rear parcel shelf; an engagement member that is arranged in a rotatable manner about a first axis so as to engage with a striker to hold a seat in an erect posture; a release lever that is arranged in a rotatable manner about the first axis and configured to rotate the engagement member in a releasing direction in response to a release operation of a release operation member arranged in a trunk room; and a pressing lever that is arranged in a rotatable manner about a second axis different from the first axis and that is urged so as to press the striker in a frontwardly inclined direction of the seat. The rear parcel shelf forms an upper wall of the trunk room arranged on a rear side of a vehicle. The seat is arranged in front of the trunk room. The striker is provided to a rear face of the seat.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, the explanation is specifically made on a preferred embodiment of a seat lock device according to the present invention with reference to attached drawings.

Figure 1:
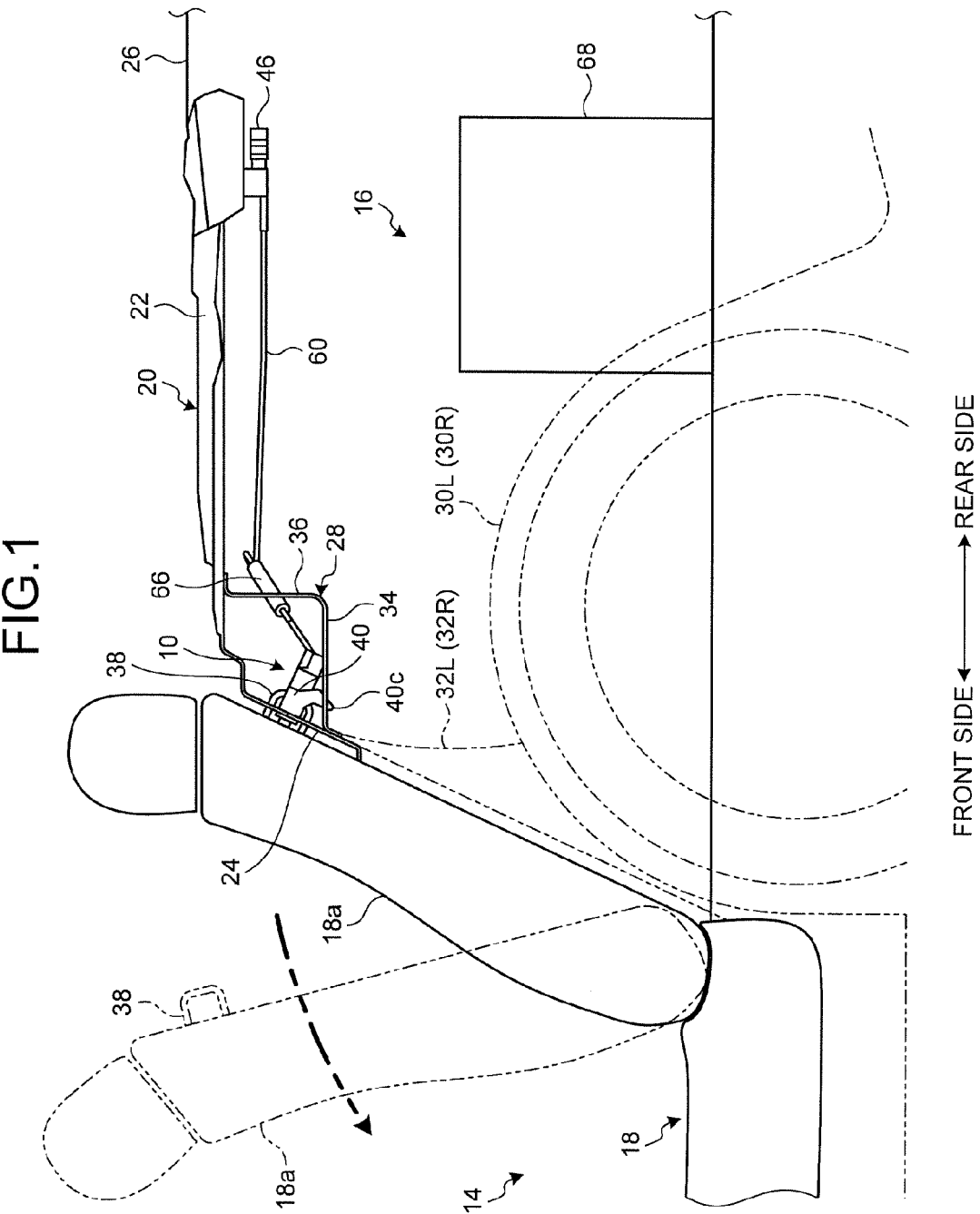
FIG. 1 is a side view illustrating schematically a structure of the rear part of a vehicle provided with a seat lock device according to one embodiment of the present invention.
Figure 2:
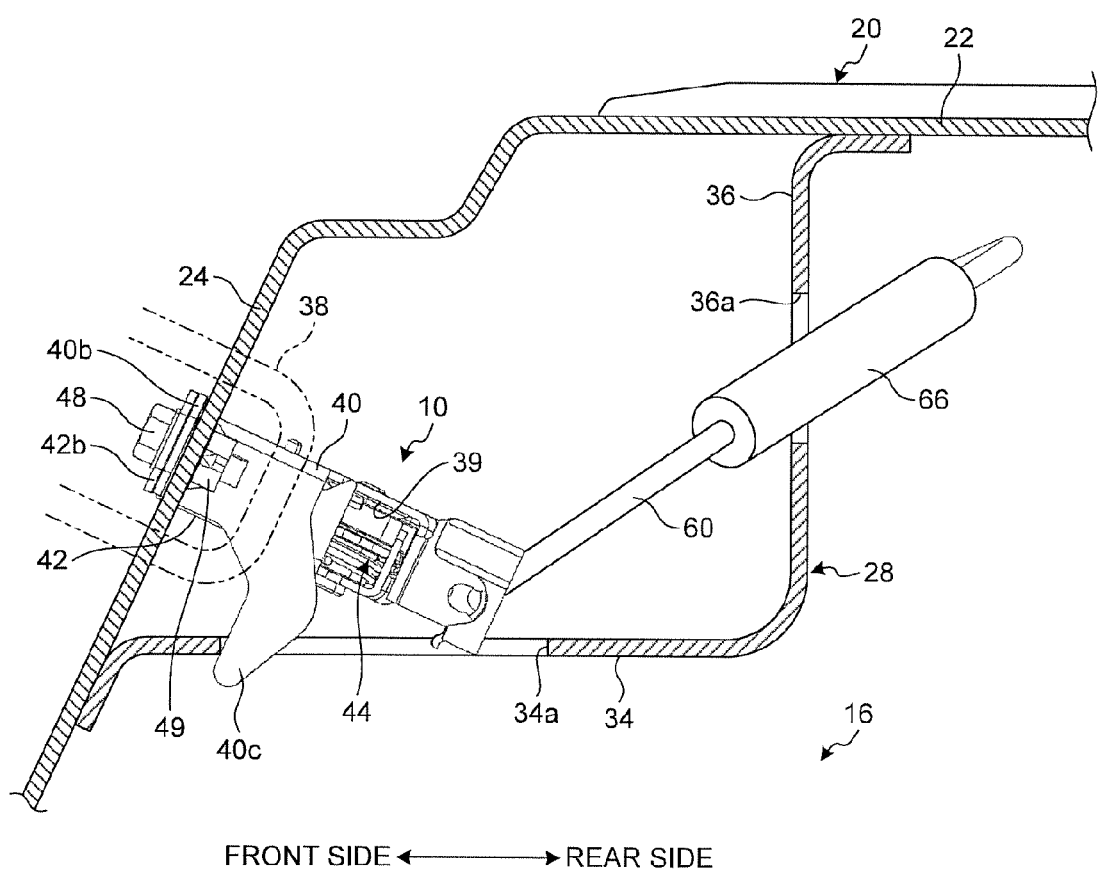
FIG. 2 is a cross-sectional side view illustrating a mounting structure of the seat lock device illustrated in FIG. 1.
Figure 3:
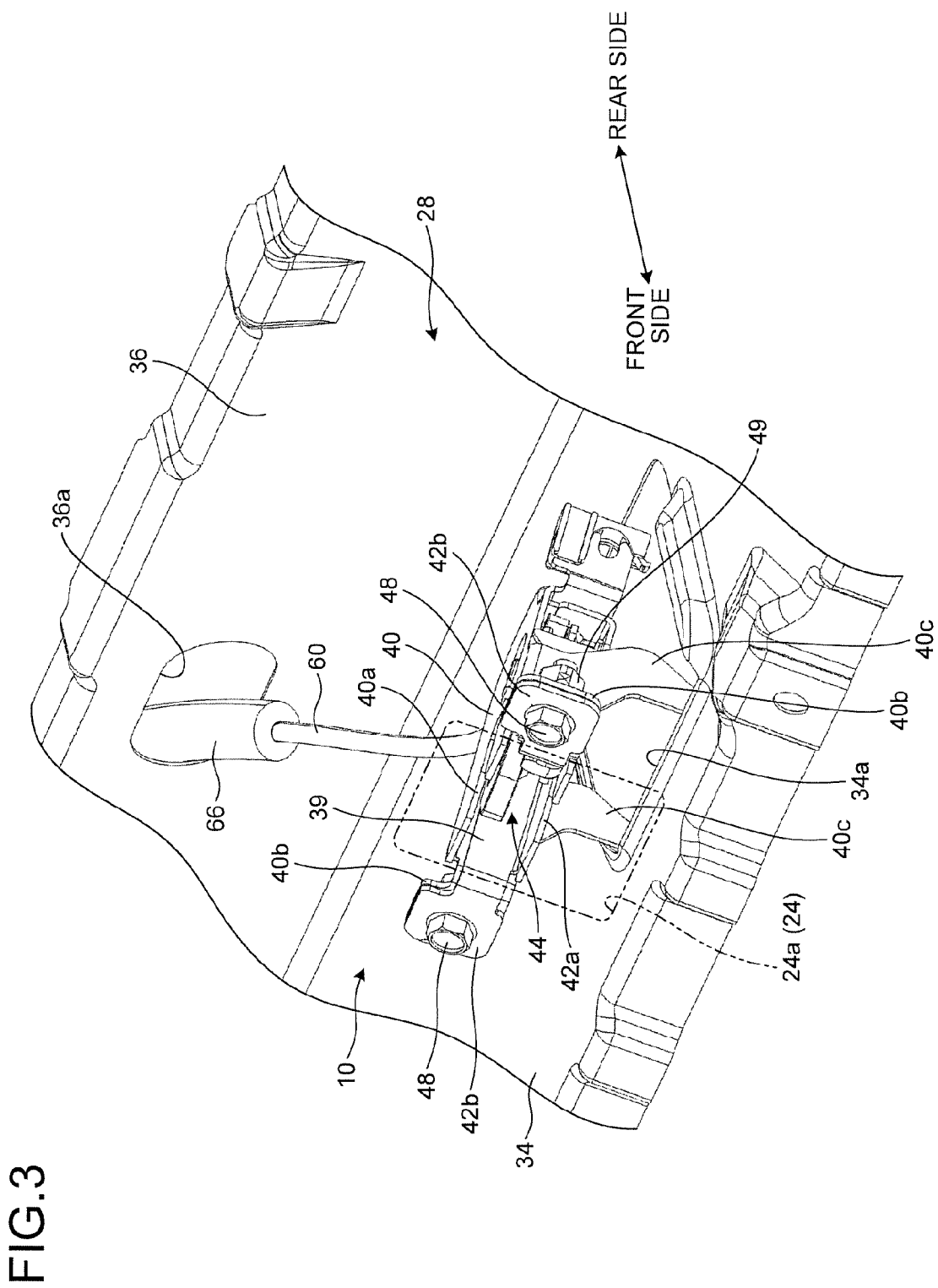
FIG. 3 is a perspective view illustrating the mounting structure of the seat lock device illustrated in FIG. 1.

FIG. 1 is a side view illustrating schematically a structure of the rear part of a vehicle 12 provided with a seat lock device 10 according to one embodiment of the present invention. FIG. 2 is a cross-sectional side view illustrating a mounting structure of the seat lock device 10 illustrated in FIG. 1, and FIG. 3 is a perspective view illustrating the mounting structure of the seat lock device 10 illustrated in FIG. 1.

The vehicle 12 is a three-box sedan type four-wheeled vehicle and, as illustrated in FIG. 1, a passenger compartment 14 and a trunk room 16 are partitioned with a seat back 18a of a rear seat 18 and a rear parcel shelf 20.

The rear parcel shelf 20 is formed of sheet steel, and has a base wall 22 arranged in a substantially horizontal manner and a front wall 24 formed by being bent downwardly from the front end portion of the base wall 22. The base wall 22 is a plate-like member that covers the upper front side portion of the trunk room 16 thus forming a part of the upper wall of the trunk room 16. The rear end portion of the base wall 22 is connected with a trunk lid 26 that forms the rest of the upper wall of the trunk room 16, in an openable and closable manner. The front wall 24 is a plate-like member having an upper end portion being inclined in the rearward direction to receive the upper back portion of the seat back 18a.

The front wall 24 is provided with a cross member 28 arranged on the rear side thereof and extending in the vehicle width direction. The cross member 28 is, as illustrated in FIG. 1, a vehicle body member extending in the vehicle width direction and connected with side wall members 32L and 32R so that the cross member 28 connects the upper end portions of the side wall members 32L and 32R that are arranged on the respective right and left sides of a vehicle body and each raised upwardly from the vicinity of each of rear wheel houses 30L and 30R arranged on the respective right and left sides of the vehicle body. The cross member 28 is formed of sheet steel in a substantially L-shape as viewed in a cross-sectional view, and has a horizontal wall 34 on the front side thereof, and a rear wall 36 formed so as to be bent upwardly from the rear end portion of the horizontal wall 34. The front wall 24 is connected with the front end portion of the horizontal wall 34, a base wall 22 is connected with the upper end portion of the rear wall 36 and hence, the rear parcel shelf 20 is fixed to the cross member 28.

The rear seat 18 is structured so that the seat back 18a that is a backrest is capable of being folded in the forward direction by way of hinges that are not illustrated in the drawings. The seat back 18a is provided with a striker 38 arranged on the upper back portion thereof, the striker 38 being engaged with the seat lock device 10 to hold the seat back 18a in an erect posture so that the seat back 18a is rearwardly inclined as indicated by a continuous line in FIG. 1. As described later in detail, by releasing the engagement state of the seat lock device 10 and the striker 38, the seat back 18a can be frontwardly inclined as indicated by a chain double-dashed line in FIG. 1 and folded in the frontward direction.

Next, the constitution of the seat lock device 10 is explained.

As illustrated in FIG. 2 and FIG. 3, the seat lock device 10 includes a base member 40 provided with a housing portion 39 arranged on the bottom surface side thereof, a body member 42 that covers the bottom surface side of the housing portion 39, and an engagement mechanism 44 arranged by being housed in the housing portion 39 surrounded by the base member 40 and the body member 42. The seat lock device 10 is attached to the front wall 24 of the rear parcel shelf 20, and the engagement mechanism 44 engages with the striker 38, thus holding the seat back 18a in an erect posture, while a release operation of a release operation member 46 (see FIG. 1) arranged in the trunk room 16 releases the engagement state of the engagement mechanism 44 and the striker 38.

The base member 40 is formed of sheet metal, and has a striker entering groove 40a formed so as to open in the frontward direction for receiving the striker 38, a pair of mounting pieces 40b and 40b both front end side portions of which are outwardly bent in the vehicle width direction, and a pair of engagement portions 40c and 40c each of which is extended downwardly from one of the both side portions on the rear side of the mounting piece 40b. In each mounting piece 40b, a through hole for inserting a bolt 48 is formed in the thickness direction. Each engagement portion 40c is a projecting piece such that the side portion of the base member 40 is extended downwardly, and the substantially center portion of the engagement portion 40c in the vertical direction as viewed in a side view illustrated in FIG. 2 is formed in a substantially V-shape by being bent so as to project to the rear side.

The body member 42 is formed of sheet metal, and has a striker entering groove 42a formed so as to open in the frontward direction for receiving the striker 38, and a pair of mounting pieces 42b and 42b both front end side portions of which are extended while being bent outwardly in the vehicle width direction. The striker entering groove 42a is arranged at a position such that the striker entering groove 42a is aligned with the striker entering groove 40a of the base member 40 in the vertical direction. In each mounting piece 42b, a through hole for inserting the bolt 48 is formed in the plate thickness direction.

The seat lock device 10 is constituted in a state that the body member 42 is arranged on the bottom surface side of the base member 40, and the respective mounting pieces 40b and 42b are arranged on the front side of the seat lock device 10 while overlapping with each other. The seat lock device 10 is inserted into an opening 24a (see a chain double-dashed line in FIG. 3) of the front wall 24 of the rear parcel shelf 20 from the front side of the opening 24a, and is arranged so that both the mounting pieces 40b and 42b overlap with the front-face side of the front wall 24. In this state, the bolts 48 are inserted into the respective through holes of both the mounting pieces 40b and 42b from the front side of the front wall 24, and tightened with respective nuts 49 placed on the rear face side of the front wall 24 and hence, the seat lock device 10 is fixed to the front wall 24.

In this mounting state, the seat lock device 10 is constituted so that each engagement portion 40c of the base member 40 is arranged so as to be inserted into an opening 34a formed in the horizontal wall 34 of the cross member 28 and, at the same time, arranged at a position such that the engagement portion 40c is brought into contact with (or is close to) the front brim portion of the opening 34a in the direction orthogonal to the thickness of the engagement portion 40c (see FIG. 2 and FIG. 3). In this case, the engagement portion 40c is formed in a substantially V-shape that is a shape projecting in the rearward direction, thus being engaged more stably with the front end portion of the opening 34a in the frontward direction.

FIG. 4 to FIG. 7 are bottom views each illustrating the internal structure of the seat lock device 10, and illustrating an engagement operation of the engagement mechanism 44 of the seat lock device 10 and the striker 38 of the rear seat 18. In each of FIG. 4 to FIG. 7, in order to explicitly illustrate the structure of the engagement mechanism 44, the illustration of the body member 42 is omitted.

As illustrated in FIG. 4 to FIG. 7, the engagement mechanism 44 has a hook member 50 that is an engagement member to be engaged with the striker 38, a release lever 52 that releases the engagement state of the hook member 50 and the striker 38, and a pressing lever 54 that presses the striker 38 in the direction away from the hook member 50.

The hook member 50 is a plate-like latch member in which a first shaft (hook shaft) 56 is inserted into a through hole formed in the rear side of the hook member 50 near the center portion of the hook member 50. The hook member 50 has an engagement groove 50a that opens in the peripheral face of the hook member 50, and a pin 50b that projects from the bottom surface of the hook member 50. The hook member 50 is arranged in a rotatable manner about the axial center of the first shaft 56 so that the engagement groove 50a intersects with the striker entering groove 40a (42a), and urged by a hook spring 58 clockwise about the first shaft 56 as the center, in FIG. 4 to FIG. 7.

The release lever 52 is a plate-like member in which the first shaft 56 is inserted into a through hole formed at a substantially center portion of the release lever 52. The release lever 52 has a contact portion 52a that is brought into contact with the pin 50b of the hook member 50, and a cable connection portion 52b to which one end of a cable 60 is connected. The other end of the cable 60 is connected to the release operation member 46. The release lever 52 is rotatable about the axial center of the first shaft 56 that is the same axis as that of the hook member 50. The release lever 52 is, when the cable connection portion 52b is pulled by the cable 60, rotated counterclockwise in FIG. 4 to FIG. 7 to press the pin 50b with the contact portion 52a, and the hook member 50 is rotated counterclockwise against the urging force of the hook spring 58.

The pressing lever (pop-up lever) 54 is a plate-like member in which a second shaft (pressing-lever shaft) 62 is inserted into a through hole formed in the L-shaped bend portion of the pressing lever 54. The pressing lever 54 has a pressing portion 54a projecting toward a hook-member-50 side, and a stopper portion 54b projecting frontwardly from the pressing portion 54a in such a manner that the stopper portion 54b is substantially orthogonal to the pressing portion 54a. The pressing lever 54 is rotatable about the axial center of the second shaft 62 that is a separate axis from that of the first shaft 56, and urged by a pressing spring 64 clockwise about the second shaft 62 as the center, in FIG. 4 to FIG. 7.

The release operation member 46 is, as illustrated in FIG. 1, attached to the rear end portion on the bottom surface of the rear parcel shelf 20 in the trunk room 16, and connected with the release lever 52 by way of the cable 60. As illustrated in FIG. 1 to FIG. 3, the cable 60 is routed along the upper portion in the trunk room 16 from the release operation member 46, inserted into a cable insertion opening 36a formed in the rear wall 36 of the cross member 28, and connected to the release lever 52. Therefore, for example, when the release operation member 46 is operated so as to be pulled in the rearward direction against the urging force of an elastic member that is not illustrated in the drawings, the force of operating the release operation member 46 is transmitted to the release lever 52 by way of the cable 60, and the release lever 52 is rotated counterclockwise in FIG. 4 to FIG. 7. Here, the cable 60 is provided with a buffer member 66 on the outside portion thereof, which is inserted into the cable insertion opening 36a, for preventing damage to the cable 60 at an edge portion.

Next, the engagement operation of the engagement mechanism 44 and the striker 38 is explained with reference to FIG. 4 to FIG. 7.

Figure 4:
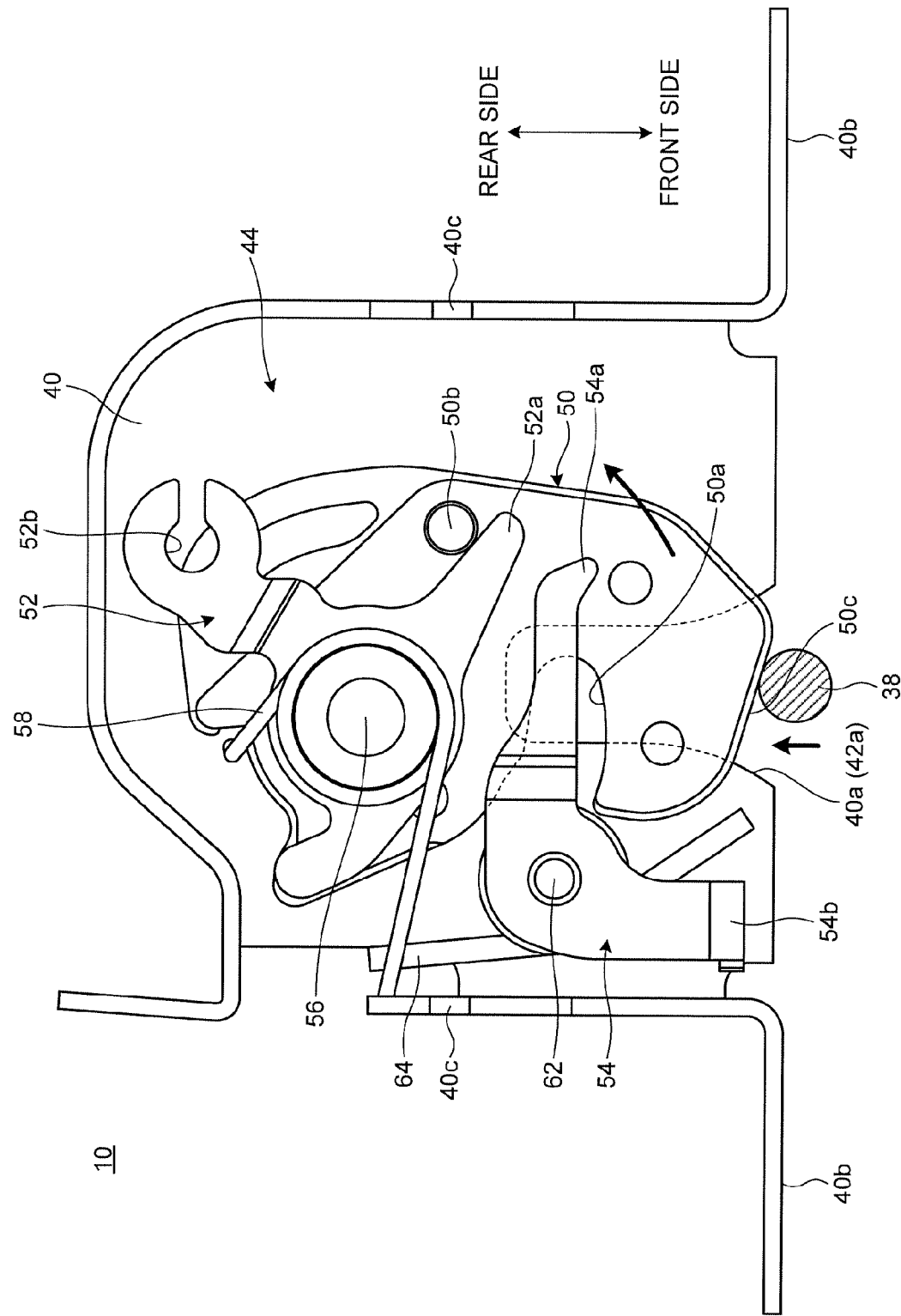
FIG. 4 is a bottom view illustrating an internal structure of the seat lock device in an unlocked state.

First, in a state that the seat back 18a is, for example, folded in the frontward direction and the striker 38 and the engagement mechanism 44 are not engaged with each other as illustrated in FIG. 4, the urging force of the hook spring 58 causes the hook member 50 to be in a state that the engagement groove 50a intersects with the striker entering groove 40a (42a) (unlocked state). In this state, when the seat back 18a is pressed in the rearward direction, as illustrated in FIG. 4, the striker 38 that enters into the striker entering groove 40a (42a) in the rearward direction is brought into slide contact with an inclined surface 50c that is contiguously formed with the engagement groove 50a of the hook member 50 while pressing the inclined surface 50c. As a result, the hook member 50 is rotated counterclockwise in FIG. 4 against the urging force of the hook spring 58.

Figure 5:
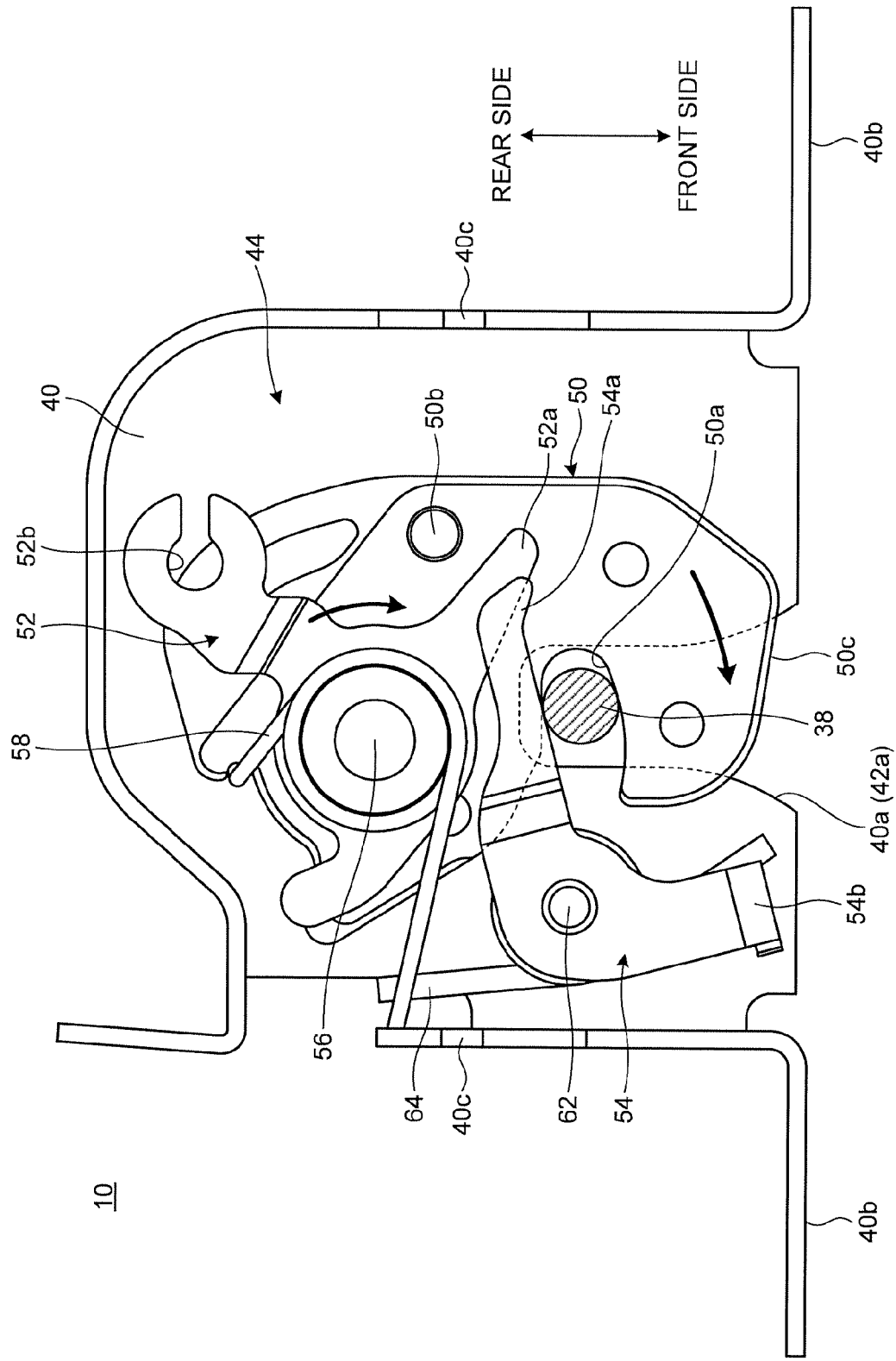
FIG. 5 is a bottom view illustrating the internal structure of the seat lock device in a locked state.

When the striker 38 is further pushed in the rearward direction so as to go over the inclined surface 50c, as illustrated in FIG. 5, the striker 38 is engaged with the engagement groove 50a, and the hook member 50 is rotated clockwise by the urging force of the hook spring 58. Accordingly, the hook member 50 is in a state in which the striker 38 is housed in the engagement groove 50a while the engagement groove 50a intersects with the striker entering groove 40a (42a) again, and the striker 38 and the engagement mechanism 44 are engaged with each other (locked state).

In this case, the pressing lever 54 is urged by the pressing spring 64 clockwise in FIG. 5 and hence, the pressing portion 54a is in a state in which the pressing portion 54a presses the striker 38 engaged with the engagement groove 50a in the frontward direction. Accordingly, the striker 38 is in a state in which the striker 38 is pressed elastically by the front side inner wall surface of the engagement groove 50a and the pressing portion 54a that sandwich the striker 38 therebetween and hence, the striker 38 does not rattle. That is, when the seat lock device 10 is in a locked state, the rattle of the striker 38 is suppressed, and thus the rattle of the seat back 18a is suppressed, thereby improving the quality of the rear seat 18.

Figure 6:
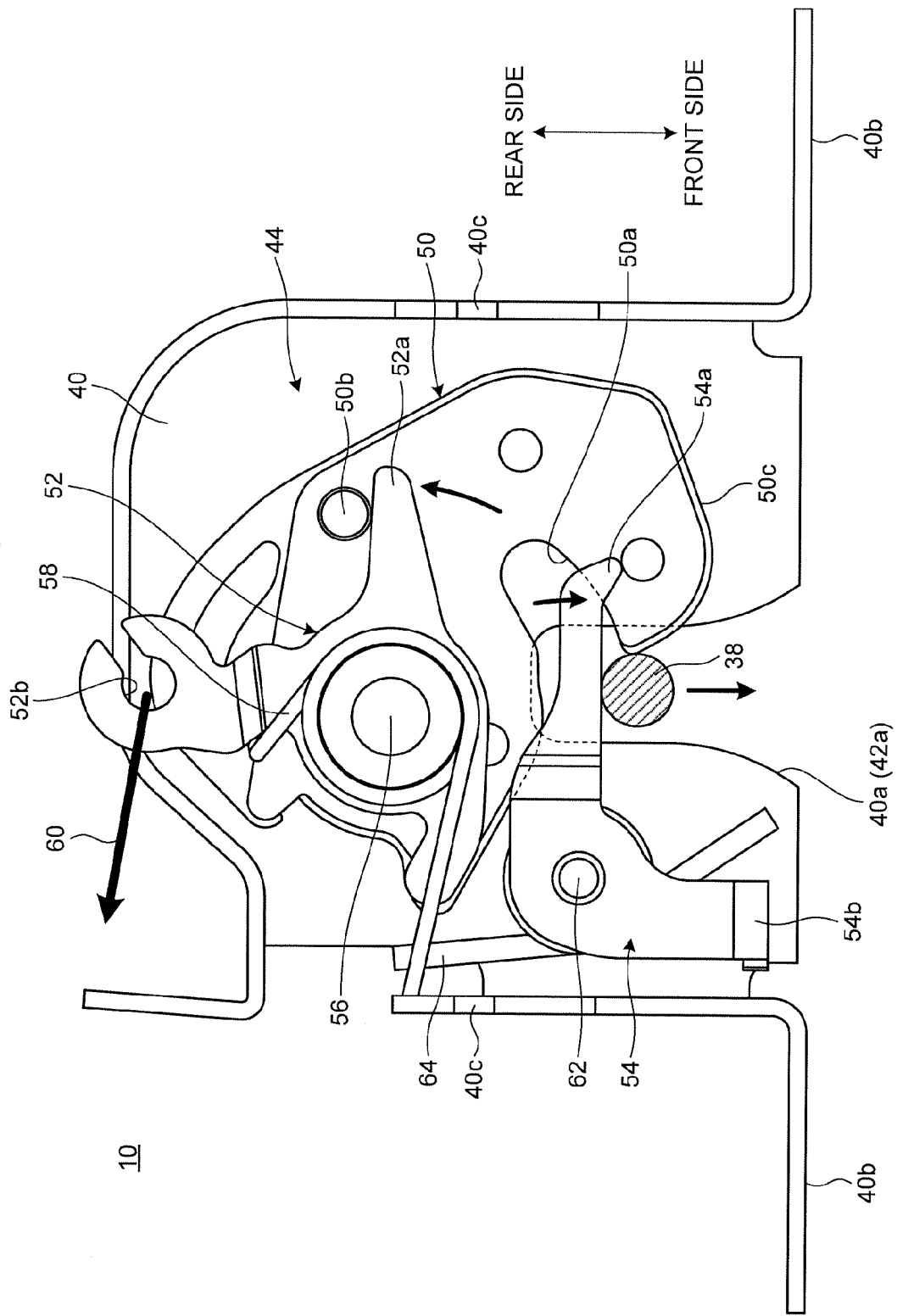
FIG. 6 is a bottom view illustrating the internal structure of the seat lock device when the release operation of a release lever is performed to release the seat lock device from a locked position.

Next, when the locked state of the seat lock device 10, that is, the engagement state of the striker 38 and the engagement mechanism 44, is released to fold the seat back 18a in the frontward direction, the release operation of the release operation member 46 arranged in the trunk room 16 is performed. Accordingly, a release operation force input to the release operation member 46 is transmitted by way of the cable 60, the release lever 52 is, as illustrates in FIG. 6, rotated counterclockwise, the pin 50b is pressed by the contact portion 52a and hence, the hook member 50 is also rotated counterclockwise. Furthermore, as illustrated in FIG. 6, when the engagement groove 50a of the hook member 50 is aligned with the striker entering groove 40a (42a), the striker 38 is in a state in which the striker 38 is capable of being disengaged from the engagement groove 50a. Here, the rotation of the release lever 52 and the hook member 50 in the releasing direction is, as illustrated in FIG. 7, restricted by the inner wall surface of the base member 40 with which the peripheral face of the hook member 50 is brought into contact.

Figure 7:
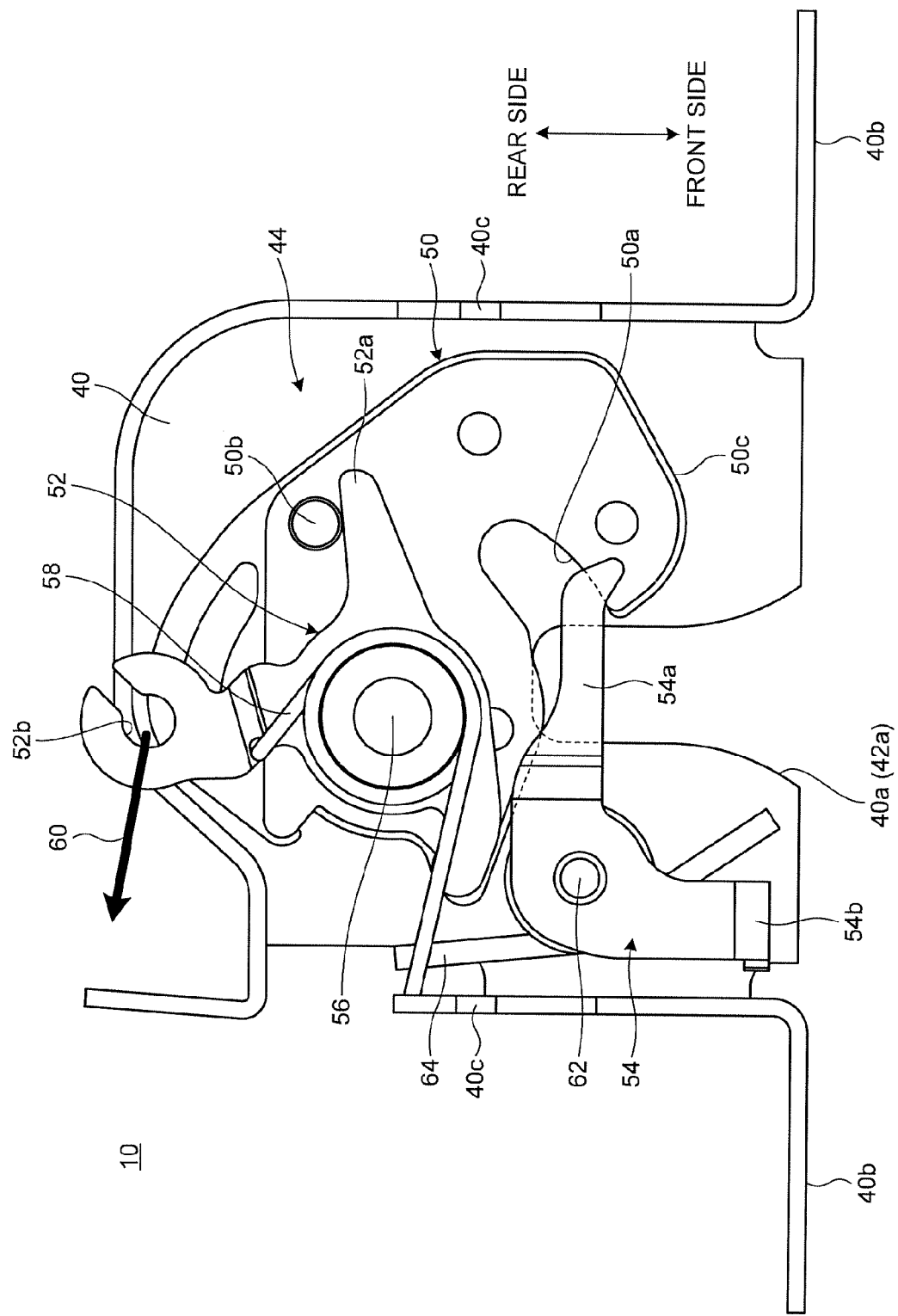
FIG. 7 is a bottom view illustrating the internal structure of the seat lock device in a state that a striker is completely disengaged from the state illustrated in FIG. 6.

As a result, the pressing portion 54a of the pressing lever 54 that is strongly rotated clockwise in FIG. 6 by a reaction force of the pressing spring 64 pushes, as illustrated in FIG. 6 and FIG. 7, the striker 38 in the frontward direction from the striker entering groove 40a (42a), the seat lock device 10 is in an unlocked state, and the rotation of the pressing lever 54 is restricted by the inner wall surface of the base member 40 with which the stopper portion 54b is brought into contact. In this case, the striker 38 is strongly pushed in the frontward direction from the striker entering groove 40a (42a) by the reaction force of the pressing spring 64 and hence, the seat back 18a changes the posture thereof into a frontwardly inclined posture from a rearwardly inclined posture, and is folded smoothly in the frontward direction by the weight of the seat back 18a.

That is, the seat lock device 10 has a pop-up function capable of frontwardly inclining and folding the seat back 18a being in a rearwardly-inclined and erect posture by simply performing the release operation of the release operation member 46. Accordingly, a user does not need to take time and efforts to, after operating the release operation member 46 in the trunk room 16, go to the rear seat of the vehicle 12 to incline manually the seat back 18a released from the locked state.

To consider a case where the seat lock device 10 constituted in this manner is in a locked state, when a brake is suddenly applied to the vehicle 12 or an impact is input to the vehicle 12, there exists the case that a baggage 68 (see FIG. 1) loaded in the trunk room 16 is largely moved in the frontward direction, and strongly presses the seat back 18a of the rear seat 18 and the front wall 24 of the rear parcel shelf 20 in the frontward direction. Accordingly, there may be a case in which the seat lock device 10 being in a connected state with the seat back 18a pressed in the frontward direction by way of the striker 38 is pulled in the frontward direction, or the seat lock device 10 is directly pulled in the frontward direction by the front wall 24 pressed in the frontward direction and hence, the cable 60 being in a state that the position thereof is fixed is pulled, the release lever 52 is unintentionally operated, and the seat lock device 10 is in an unlocked state.

As for the above-mentioned problem, in the seat lock device 10 according to the present embodiment, the engagement portion 40c is engaged with the cross member 28 that is a vehicle body member extending in the vehicle width direction on the rear side of the front wall 24 of the rear parcel shelf 20. Therefore, even when the seat back 18a and the front wall 24 are pressed in the frontward direction upon receiving the impact of the baggage 68, the movement of the seat lock device 10 in the frontward direction is suppressed by the engagement state of the engagement portion 40c and the cross member 28, and the above-mentioned unintentional release operation is prevented. Furthermore, the movement of the seat lock device 10 is suppressed by the cross member 28 that is a vehicle body member and hence, it is unnecessary to add a reinforcing member to the rear parcel shelf 20, and an increase in weight of a vehicle, complication of a structure, or the like can be avoided.

In this case, the engagement portion 40c is brought into contact with the front brim portion of the opening 34a of the cross member 28 and hence, it is possible to restrict surely the movement of the seat lock device 10 toward the front side of the vehicle 12 with a simple structure. Furthermore, the engagement portion 40c is integrally formed with the base member 40 by extending a part of the base member 40 in which the hook member 50 engaged with the striker 38 is housed and hence, it is possible to restrict the movement of the seat lock device 10 with a high strength structure. In addition, the right and left side portions of the base member 40 are extended to provide a pair of the engagement portions 40c, each of which is brought into contact with the opening 34a of the cross member 28 in the direction orthogonal to the thickness thereof and hence, it is possible to more surely and stably restrict the movement of the seat lock device 10.

According to the embodiment of the seat lock device, even when the baggage loaded in the trunk room is largely moved in the frontward direction at the time of sudden braking of the vehicle or input of an impact to the vehicle, and strongly presses the rear face of the seat and the front wall of the rear parcel shelf in the frontward direction, the engagement portion is engaged with the vehicle body member and hence, it is possible to suppress the frontward movement of the seat lock device and to prevent the occurrence of the unintended release operation of the seat lock device.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A seat lock device comprising:
   an engagement portion engaged with a cross member, the cross member extending in a vehicle width direction behind a front wall of a rear parcel shelf, wherein
   the rear parcel shelf forms an upper wall of a trunk room arranged on a rear side of a vehicle, and
   the seat lock device is attached to the front wall of the rear parcel shelf, engaged with a striker provided to a rear face of a seat arranged in front of the trunk room to hold the seat in an erect posture, and releases an engagement state thereof with the striker by a release operation of a release operation member arranged in the trunk room.

2. The seat lock device according to claim 1, wherein
   the cross member is provided with an opening, and
   the engagement portion is brought into contact with a front brim portion of the opening.

3. The seat lock device according to claim 2, wherein the engagement portion is integrally formed with a base member in which an engagement member engaged with the striker is housed, by extending a part of the base member.

4. The seat lock device according to claim 3, wherein right and left side portions of the base member are extended to provide a pair of the engagement portions, each of which is brought into contact with the opening in a direction orthogonal to the thickness thereof.

5. A seat lock device comprising:
   an engagement portion engaged with a cross member, the cross member extending in a vehicle width direction behind a front wall of a rear parcel shelf, wherein the rear parcel shelf forms an upper wall of a trunk room arranged on a rear side of a vehicle;
   an engagement member that is arranged in a rotatable manner about a first axis so as to engage with a striker to hold a seat in an erect posture, wherein the seat is arranged in front of the trunk room, and the striker is provided to a rear face of the seat;
   a release lever that is arranged in a rotatable manner about the first axis and configured to rotate the engagement member in a releasing direction in response to a release operation of a release operation member arranged in the trunk room; and
   a pressing lever that is arranged in a rotatable manner about a second axis different from the first axis and that is urged so as to press the striker in a frontwardly inclined direction of the seat.

6. The seat lock device according to claim 5, wherein the pressing lever is configured to hold the striker between the engagement member and the pressing lever in a state that the striker is engaged with the engagement member.

7. The seat lock device according to claim 5, wherein
the cross member is provided with an opening, and
the engagement portion is brought into contact with a front brim portion of the opening.

8. The seat lock device according to claim 5, wherein the engagement portion is integrally formed with a base member in which the engagement member is housed, by extending a part of the base member.

9. The seat lock device according to claim 8, wherein right and left side portions of the base member are extended to provide a pair of the engagement portions, each of which is brought into contact with an opening in a direction orthogonal to the thickness thereof.

\* \* \* \* \*